(12) United States Patent
Boden et al.

(10) Patent No.: US 6,330,562 B1
(45) Date of Patent: Dec. 11, 2001

(54) SYSTEM AND METHOD FOR MANAGING SECURITY OBJECTS

(75) Inventors: Edward B. Boden; Franklin A. Gruber, both of Vestal; Mark J. Melville, Endwell; Frank V. Paxhia, Binghamton; Michael D. Williams, Owego, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,693

(22) Filed: Jan. 29, 1999

(51) Int. Cl.⁷ ...................................................... G06F 17/30
(52) U.S. Cl. ................................ 707/10; 707/9; 709/220; 713/200; 713/201; 713/202
(58) Field of Search ................. 707/9–10; 713/200–202; 709/220

(56) References Cited

U.S. PATENT DOCUMENTS

| | | | |
|---|---|---|---|
| 5,051,982 | 9/1991 | Brown et al. | 370/58.2 |
| 5,621,727 | 4/1997 | Vaudreuil | 370/60 |
| 5,764,909 | 6/1998 | Nishimura | 395/200.53 |
| 5,768,271 | 6/1998 | Seid et al. | 370/389 |
| 5,835,726 | 11/1998 | Shwed et al. | 395/200.59 |
| 5,842,043 | 11/1998 | Nishimura | 395/856 |

*Primary Examiner*—Hosain T. Alam
*Assistant Examiner*—Camy Truong
(74) *Attorney, Agent, or Firm*—Shelley M Beckstrand

(57) ABSTRACT

A data model for abstracting customer-defined VPN security policy information. By employing this model, a VPN node (computer system existing in a Virtual Private Network) can gather policy configuration information for itself through a GUY, or some distributed policy source, store this information in a system-defined database, and use this information to dynamically negotiate, create, delete, and maintain secure connections at the IP level with other VPN nodes.

15 Claims, 6 Drawing Sheets

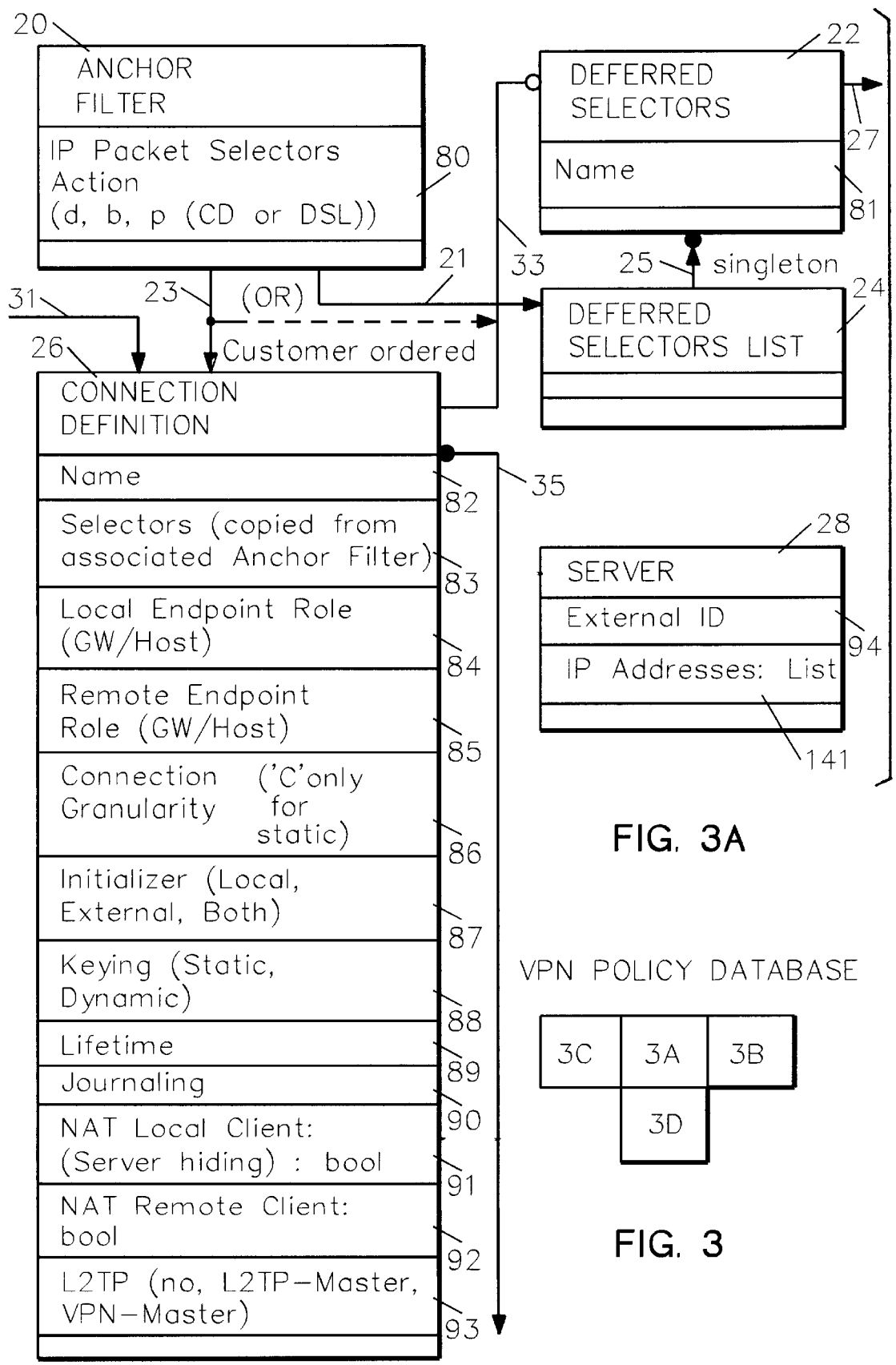

SYSTEM AND METHOD FOR MANAGING SECURITY OBJECTS

CROSS REFERENCES TO RELATED APPLICATIONS

U.S. patent application Ser. No. 09/240,720, entitled "System and Method for Network Address Translation Integration With IP Security"; Ser. No. 09/239,694, entitled "System and Method for Dynamic Micro Placement of IP Connection Filters"; Ser. No. 09/240,483, entitled "System and Method for Central Management of Connections in a Virtual Private Network; and Ser. No. 09/240,718, entitled "System and Method for Dynamic Macro Placement of IP Connection Filters", filed concurrently herewith are assigned to the same assignee hereof and contain subject matter related, in certain respects, to the subject matter of the present application. The above-identified patent applications are incorporated herein by reference.

BACKGROUND OF THE INVENTION

1. Technical Field of the Invention

This invention pertains to data security. More particularly, it pertains to the creation, deletion and retrieval of security connection objects and the querying of cryptographic services.

2. Background Art

It is currently state of the art of the Internet to create Virtual Private Networks (VPNs) using Internet Protocol Security (IPSec). However, there exists no standard nor current implementation for configuring and implementing the connection of systems in this Internet environment, such as between systems using the Transmission Control Protocol/Internet Protocol (TCPIP) and systems using the Internet Protocol Security (IPSec). Typically, graphical user interfaces (GUIs) are provided that configure data security policies only. There is, therefore, a need in the art to provide a connection model and GUI for configuring the connection of disparate systems, particularly in an Internet environment.

With the onset of network computing came the need to insure secure connections between networked computers. Usually companies resorted to establishing private networks to do this, and at considerable expense. However, as this trend of Network Computing continues to evolve, it is necessary to extend secure communications within the enterprise and to utilize the public networks. Driving factors include the need for mobility, company mergers and acquisitions, and the usual 'improving the bottom line'. Virtual Private Networks (VPNs), in this context, allow customers to use existing private or public networks, including the Internet, to establish secure connections between other businesses, branch offices, and remote users. One problem with VPNs is they are usually implemented via proprietary techniques, such that interoperability is limited to single vendor solutions. The IETF now has working groups and draft standards which will allow a more uniform VPN solution across vendors that implement to those standards. IP Security (IPSEc) and Internet Security Association Key Management Protocol (ISAKMP) are examples of these standards and these are the standards used in the preferred embodiment of the invention.

Current systems apply static, predefined filter rules (SPD entries, in RFC2401 terms) to a system interface. When attempting to negotiate with a remote system, if the client identifiers IDci and IDcr from the remote system do not match exactly an existing filter rule, the negotiation is unsuccessful. IDci and IDcr are the identifiers for clients of Security Associations (SAs), where ci refers to client initiator and cr to client responder. An SA is an ISAKMP (sometimes referred to as the Internet Key Exchange (IKE), which defines the IPSec domain of interpretation of the ISAKMP framework) unidirectional security protocol specific set of parameters that defines the services and mechanism necessary to protect traffic between two nodes. Consequently, there is a need in the art for enabling acceptance of previously unknown IDci and IDcr values from a remote system. Further, current implementations may have a filter rule for all IP traffic between a local host and a given subnet through a remote gateway. If so, the only connection allowed is for this set of IP traffic, and if the remote host does not have a corresponding filter rule, no connection can be established. There is, therefore, a need in the art for dynamically generating, loading and managing multiple IPSec filter rules (SPD entries) for traffic between a local host and a given subnet through a remote gateway.

Current system provide ISAKMP phase I and phase II connections. A phase I connection is an ISAKMP-to-ISAKMP secure connection used to negotiate keying material for phase II connections. A phase II connection is the actual IPSec connection to secure IP datagrams. Usually, a phase I connection is managed in a similar manner to a phase II connection, in that it is initiated, refreshed, and possibly scheduled independently. There is a need, therefore, in the art for enabling ISAKMP phase II driven phase I connections, such that unnecessary IKE traffic is avoided by only creating or refreshing a phase I connection if there is an active phase II connection that currently requires it.

Currently, filter rules are written statically with predefined IP selectors (IP addresses, port numbers, and transport protocol). However, when dealing with a dynamically assigned IP address from a third party (such as an Internet Service Provider, or ISP), there is no way currently of knowing what IP address to configure in the rules, particularly for handling different security policies for different hosts (users). There is, therefore, a need in the art for enabling connection filter rules to be generated and loaded dynamically at negotiation time, and thus handle remote initiating hosts with dynamically assigned IP addresses.

It is a further object of the invention to provide a system and method for creating, maintaining, deleting and retrieving VPN policy objects.

It is a further object of the invention to provide a system and method for enabling acceptance of previously unknown IDci/IDcr values from a remote system.

It is a further object of the invention to provide a system and method enabling dynamic generation, load, and management of multiple IPSec filter rules.

It is a further object of the invention to provide a system and method enabling ISAKMP phase II driven phase I connections.

It is a further object of the invention to provide a system and method enabling handling of remote initiating hosts with dynamically assigned IP addresses, that may have differing security policy requirements.

It is a further object of the invention to provide a system and method providing flexibility in policy definition in the areas of dynamically-assigned IP addresses, remotely-defined ISAKMP client IDs (IDci/IDcr), and separation of ISAKMP Phase I (key management) policy information from ISAKMP Phase II (data management) policy information.

It is a further object of the invention to provide a data model for representing and abstracting IPSec/ISAKMP-based VPN configuration information for an IPSec-capable computer system in a virtual private network that (1) allows for each customer-generated customer-ordered security policy database (SPD) entry, multiple VPN connections to be dynamically established (these connections may or may not have been previously defined); (2) allows for a data-security-policy-driven approach to rekeying (via ISAKMP) where (a) the key management connection (i.e. the secure connection used to exchange keying material for the data connections) is created and maintained by security policy and on an on-demand basis by data connection activity, and (b) the key connection security policy is determined solely by the identity of the remote connection endpoint; (3) allows for dynamically establishing VPN connections with different security policies and other attributes, based solely on an unfixed IP address (e.g. a user ID)—these connections may or may not have been previously defined. This aspect is used for supporting systems with dynamically-assigned IP addresses that wish to establish a VPN connection with the local system.

SUMMARY OF THE INVENTION

In accordance with the invention, a data model is provided for abstracting customer-defined VPN security polity information. By employing this model, a VPN node (computer system existing in a Virtual Private Network) can gather policy configuration information for itself through a GUI, or some distributed policy source, store this information in a system-defined database, and use this information to dynamically negotiate, create, delete, and maintain secure connections at the IP level with other VPN nodes.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 3A through 3D, arranged as illustrated in FIG. 3, are an object notation representation of the preferred embodiment of the invention.

BEST MODE FOR CARRYING OUT THE INVENTION

In accordance with the invention, a data model is provided for abstracting customer-defined VPN security polity information. By employing this model, a VPN node (computer system existing in a Virtual Private Network) can gather policy configuration information for itself through a GUI, or some distributed policy source, store this information in a system-defined database, and use this information to dynamically negotiate, create, delete, and maintain secure connections at the IP level with other VPN nodes.

Figure 1:
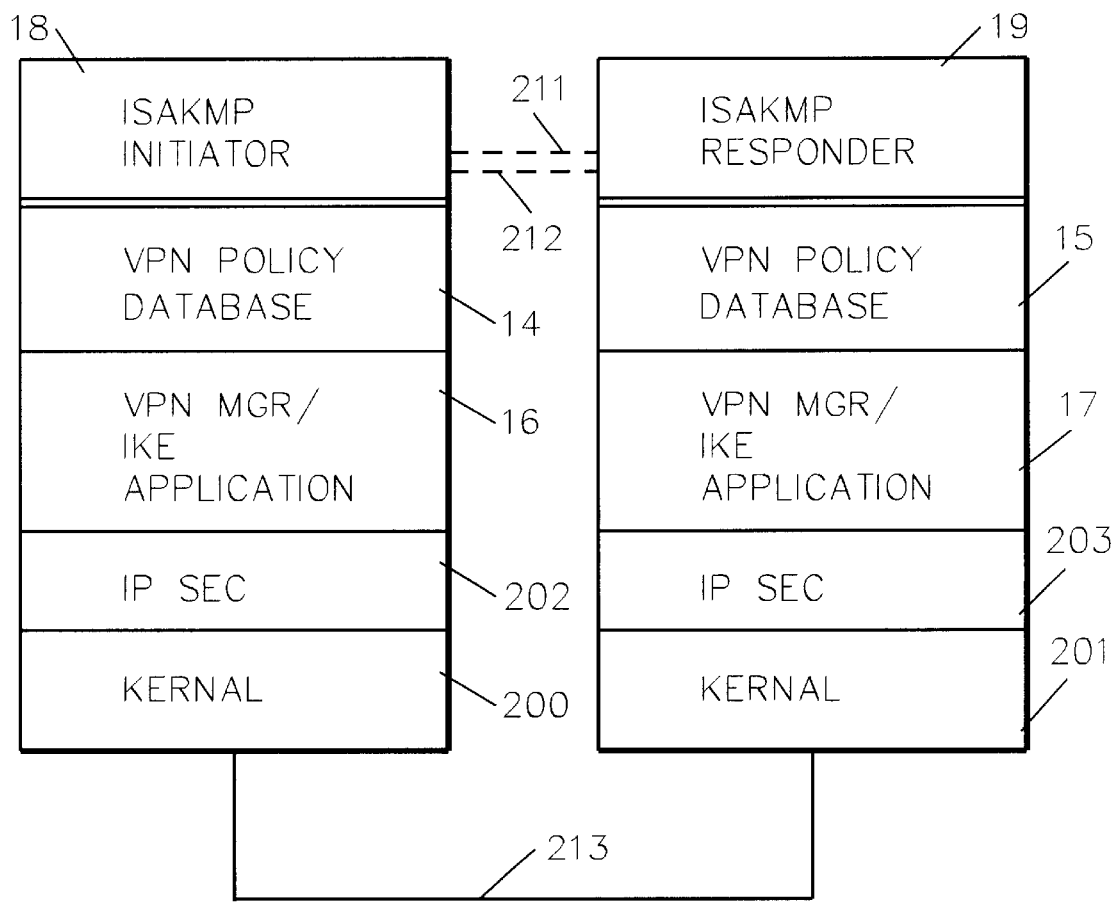
FIG. 1 is a high level system diagram illustrating initiator and responder nodes.

Referring to FIG. 1, a Virtual Private Network Connection Model (VPNCM) 14, 15 exists as a database, or other persistent storage medium, on each node 18, 19 in the VPN and executes under control of IKE (an ISAKMP application) and/or some other connection manager application 16, 17 and IPSec 202, 203 on each of initiator node 18 and responder node 19, respectively. These nodes 18, 19 may be host or gateway nodes, or systems, and are referred to as connection endpoints. Once a connection is created, filter rules (or SPD entries) and Security Associations (SAs) are loaded into the IP stack in the kernal 200, 201 to protect the connection's traffic as it passes through the stack. In a preferred embodiment of the invention, the VPN Conn Model is implemented as a database and is used by VPN Conn Mgr. IKE may be optional, since manual connections may be the only type configured. Initiator and responder are ISAKMP terms. Line 211 represents ISAKMP Phase I negotiations and line 212 represents ISAKMP Phase II negotiations. Phase II is an ISAKMP term for the negotiation of keys to protect the actual user data (i.e. the real VPN connection). This is in contrast to Phase I, which is the negotiation of keys for a ISAKMP/ISAKMP 18/19 connection to protect Phase II negotiations. Line 213 represents the resulting VPN connection protected by an IPSec.

The preferred embodiment of the invention calls for IP Security (IPSec) 202, 203 protocols (IETF RFC 2401 et al.) as the means of data protection and, optionally, Internet Security Association Key Management Protocol (ISAKMP) (IETF RFC 2408 et al.) for the means of maintaining the keys used by the negotiated IPSec protocols.

In accordance with the preferred embodiment of the invention, a connection model is provided for describing a connection policy between systems, such as between systems using the Transmission Control Protocol/Internet Protocol (TCPIP) and Internet Protocol Security (IPSec) to protect their datagrams. This preferred embodiment has been designated the Virtual Private Network Connection Model (VPNCM), and provides a way to represent connections in a Virtual Private Network (VPN). The model abstracts common information about these connections, and allows multiple connections to be based on a single connection definition. Furthermore, these connection definitions reference data security policies that describe how the traffic in a connection is protected. This enables multiple connection definitions to reference relatively few security policies. Systems participating in VPNs may have IP addresses dynamically assigned. The preferred embodiment of the invention (VPNCM) accounts for connecting to a remote system that has a dynamically-assigned IP address by using deferred selectors.

While it is currently within the state of the art to create Virtual Private Networks using Internet Protocol Security (IPSec), the Request For Comments (RFCs) and Internet Drafts for IPSec are only concerned with the lower layer of IP architecture, key exchanges, cryptographic algorithms and such. There is not standard for configuration and implementation of the connection of systems.

Figure 2:
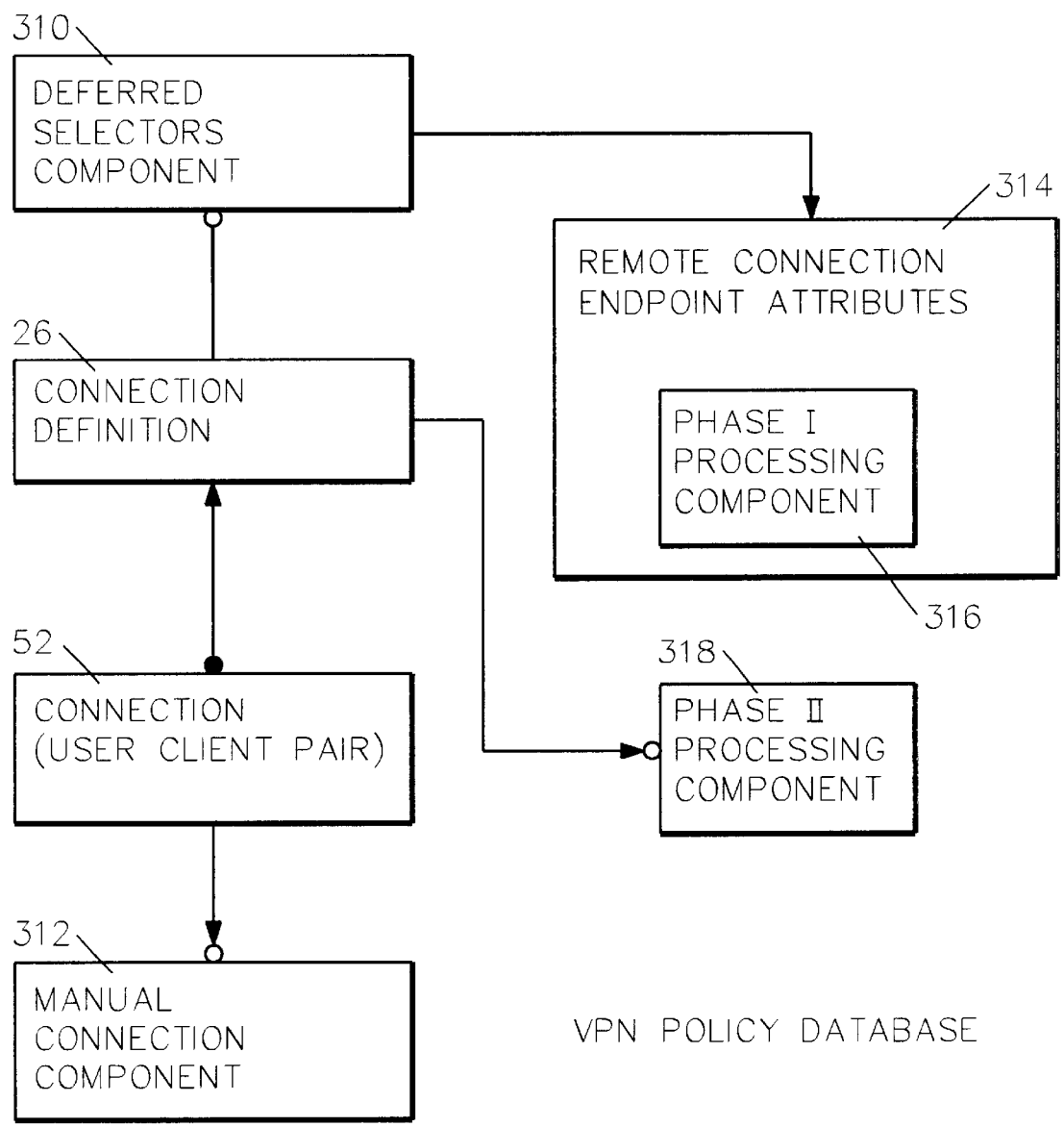
FIG. 2 is a high level system diagram illustrating the VPN policy database of FIG. 1, in accordance with the preferred embodiment of the invention.
Figure 3B:
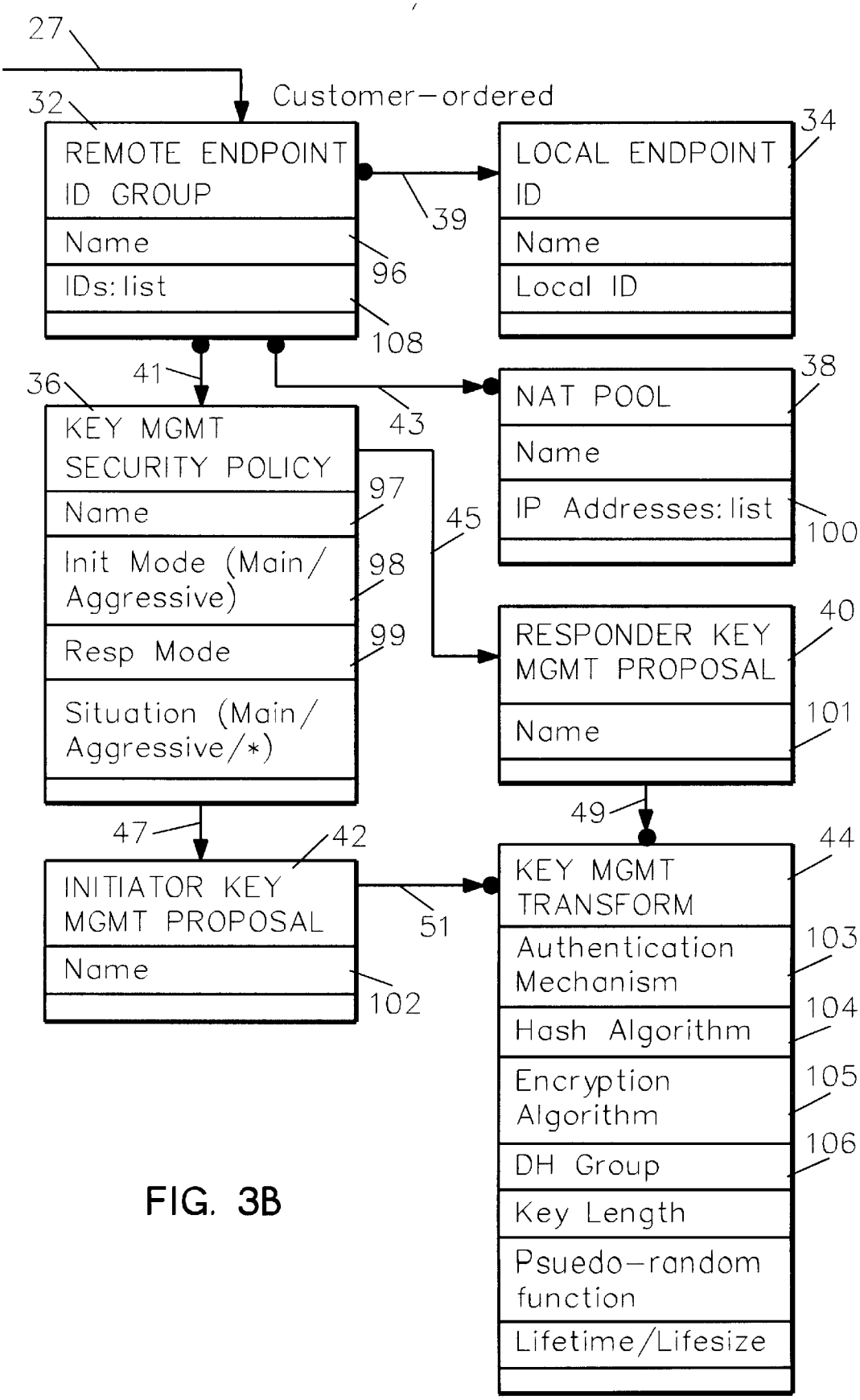

Referring to FIG. 2, VPN policy database 14, 15 is illustrated, with an instance at each of initiator node 18 and responder node 19. Each VPN policy data base 14, 15 includes deferred selectors component 310, connection definition 26, connection 52, manual connection component 312, remote connection endpoint attributes component 314 including phase 1 processing component 316, and phase 2 processing component 318. Each of these VPN policy data base 14, 15 objects will be further described in connection with FIG. 3.

User client pair 52 has a 1:1 correspondence to a connection (element 140, FIG. 9 of copending application Ser. No. 09/240,483), and represents and defines the attributes of a connection which can be instantiated (or started). When started, connection 52 gets from connection definition 26 information configured by a user by way of an anchor filter. Connection definition 26 defines how datagrams which match the anchor filter are to be protected. See copending patent application Ser. No. 09/240,718 and 09/239,694 for a description of anchor filters and their use with connection filters. User Client Pair 52 defines connection properties and, with connection definition 26 provides the information required to instantiate a connection. In so doing, if keying is static, then manual connection component 312 is accessed for additional information and if keying is dynamic, additional information is accessed from phase II processing component 318. For both static and dynamic keying, user client pair 52 contains a pointer to remote connection endpoint attributes component 314 to find the local endpoint ID and related attributes, including those of phase I processing component 316.

In the case where this local system 19 is responding to initiator system 18, initiator 18 will provide a client ID pair specifying the set of IP traffic that the connection being proposed will protect. Responder system 19 accesses its VPN policy database 15 and checks the connection definitions 26 therein to determine if the client ID pair provided by initiator 18 defines a proposed set of IP traffic (datagrams) which is a subset of the IP traffic associated with a connection definition 26 and which, therefore, responder system 19 is configured to protect.

User Client Pairs 52 map 1:1 to connections that are defined to be initiated locally. When initiating a dynamic connection, the keying attribute in connection definition 26 of the VPN policy database 14 at initiator node 18 will indicate dynamic. Consequently, initiator 18 will negotiate with responder 19, defined by the remote endpoint ID 113 of the user client pair 52 for the connection being started. Responder node 19 will obtain local client ID and remote client ID attributes from initiator 18 as part of ISAKMP Phase II negotiation, and use those IDs to select the connection definition 26 from responder database 15 that defines the connection for the responder side.

Manual connection component 12 provides information for manual (i.e., static) security associations (SAs), which information describes such attributes as encryption and authentication procedures, and must be hand coded by the user, with mirror images on both initiator 18 and responder 19 in order for a manual tunnel to work over connection 213.

Phase II negotiations 212 occur across a phase I connection 211 and result in a VPN connection 213 which is protected by an IPSec.

In order to enable acceptance at responder node 19 of a previously unknown client ID pair (IDci/IDcr) from initiator node 18, a connection definition 26 is provided in database 15 for determining if the client ID pair is acceptable to responder 19, and if so, an ISAKMP phase II negotiation component 318 provides a policy for negotiating this client ID pair.

In order to enable dynamic generation, loading and management of multiple IPSec filter rules (i.e., connection filters), a connection definition 26 is provided at responder node 19 for selection by either a user client pair 52 or a client ID pair (IDci/IDcr) received from a remote initiator for identifying pertinent granularity attributes. These granularity attributes define the subset of IP datagrams that can be associated with any one connection instantiated from this connection definition 26.

In order to enable ISAKMP phase II driven phase I connections, whereby a phase I connection is only created or refreshed based upon phase II connection activity, a reference pointer (represented by line 41, FIG. 3B) is provided for associating a remote endpoint identifier in remote connection attributes 314 with a phase I negotiation policy in phase I processing component 316.

In order to enable handling at responder node 19 of remote initiating hosts 18 with dynamically assigned IP addresses, there is provided at responder node 19 policy database 15 connection definitions 26 for identifying ISAKMP phase II negotiation policies in phase II processing component 318, anchor filters 20 (FIG. 3A) for defining the datagrams that may be associated with a remote host 18 using dynamically assigned IP addresses, and deferred selectors component 310 providing a one to many mapping from an anchor filter 20 to connection definitions 26.

In accordance with the preferred embodiment of the invention, previously unknown client ID pairs (IDci and IDcr values) are accepted from a remote system. The user writes as few as one filter rule (also referred to as an anchor rule) for the subset of IP traffic to be protected, similar to conventional filter rules. However, this anchor filter rule, by way of its association with a connection definition, is not explicit about what future security associations (SAs) will be used to protect any of the traffic defined by the anchor rule. It only specifies things like what policy to negotiate and what granularity of client IDs to accept. Connection filters are generated and loaded dynamically based on either locally defined connections (user client pair objects 52), IDci/IDcr from a remote system, or from an IP packet (for on demand connections). If a remote system offers client IDs of, say, only TCP traffic between the local host and a given subnet, connection filters for that traffic only would be generated and loaded, with all other traffic between the local host and the given subnet discarded.

Further in accordance with the preferred embodiment of the invention, ISAKMP phase II driven phase I connections are enabled. That is, a phase I connection is only created or refreshed if there is an active phase II connection that requires it. This reduces unnecessary IKE traffic. Also, phase I security policy and other attributes are based solely on the remote endpoint and not on the phase II traffic being ultimately protected, thus easing setup and policy definition.

Further, in accordance with the preferred embodiment of the invention, remote initiating hosts with dynamically assigned IP addresses are handled through the use of deferred selectors. With as little as one anchor filter, connection filter rules can be generated and loaded dynamically at negotiation time. Negotiation is performed using a non-IP-type selector, such as user@FQDN, for both phase I and phase II (whereas phase II negotiations are usually performed using IP-type only client IDs). Following successful negotiation and authentication via IKE, the remote host IP address for the filter rules is determined by the IP packet source address.

Figure 3C:
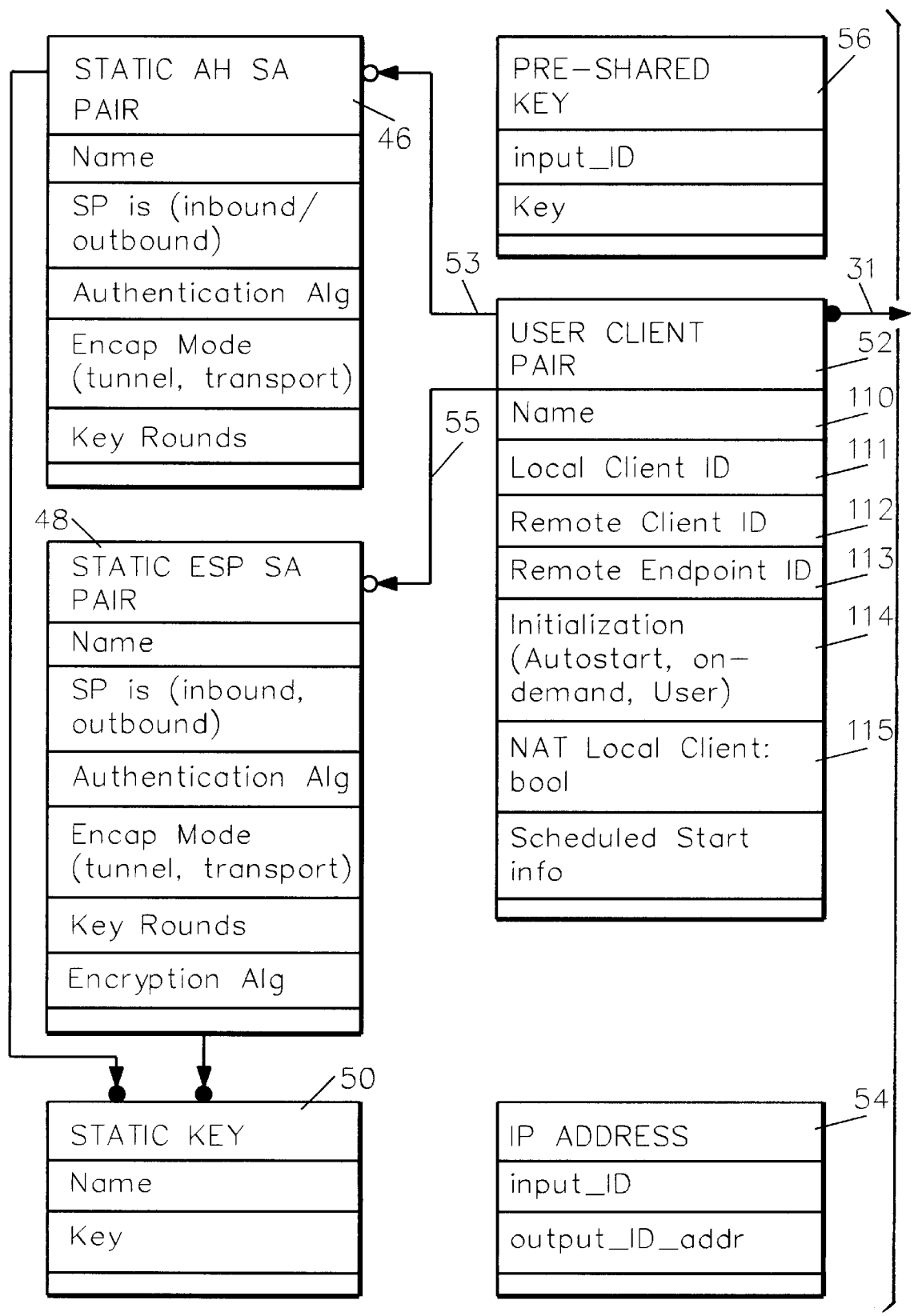
Figure 3D:
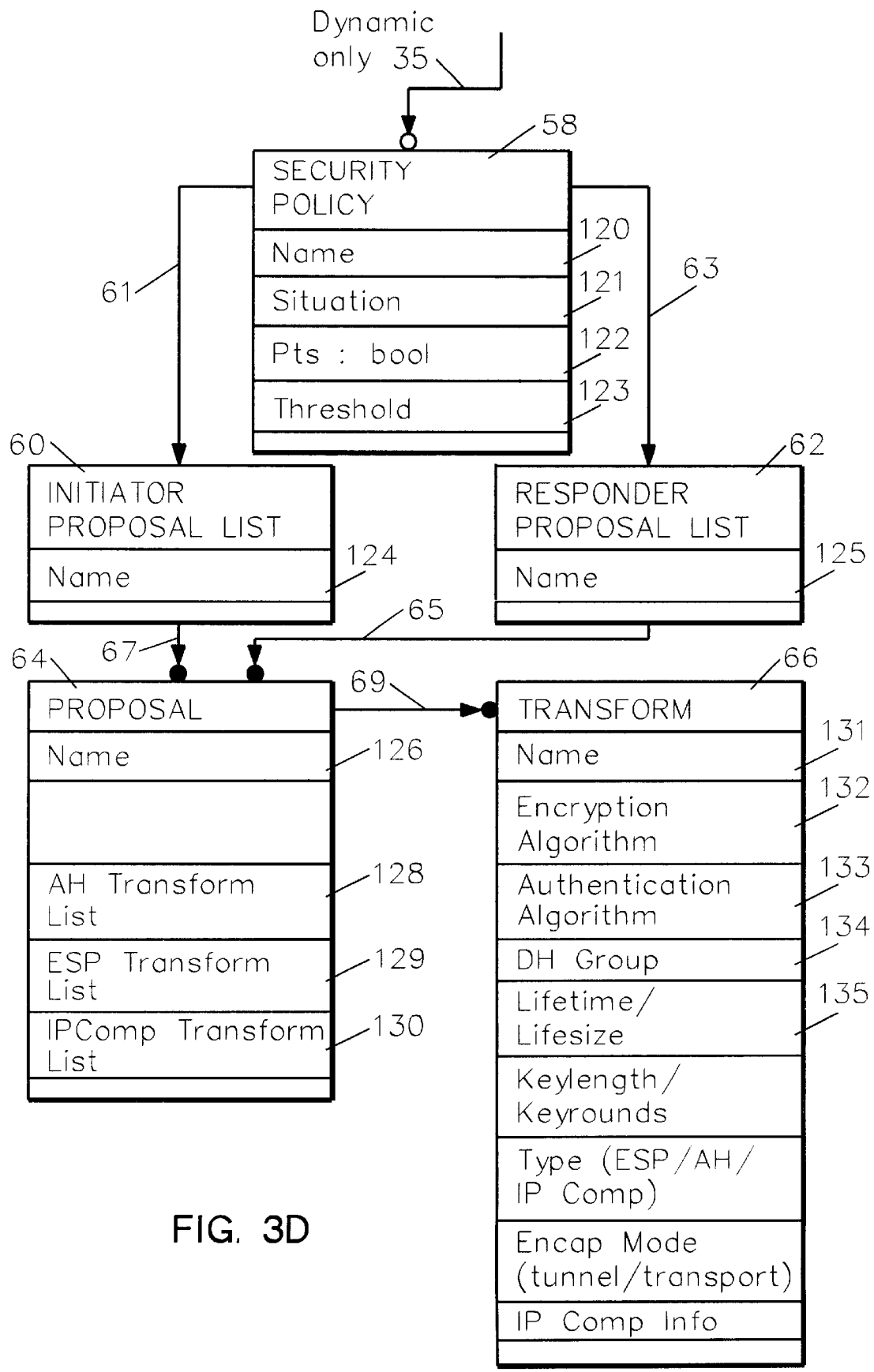

Referring to FIG. 3, the preferred embodiment of the data model of FIG. 2, designated VPNCM, is set forth in object notation. In the embodiment of FIG. 3, deferred selectors component 310 of FIG. 2 is implemented by deferred selectors 22 and deferred selectors list 24; manual connection component 312 is implemented by static ESP SA pair 48, static AH SA pair 46 and static key 50; remote connection endpoint attributes 314 is implemented by remote endpoint ID group 32, local endpoint ID 34, NAT pool 38, and IP address 54, and also including in phase I processing component 316, key management security policy 36, initiator key management proposal 42, responder key management proposal 40, key management transform 44 and pre-shared key 56; and phase II processing component 318 is implemented by security policy 58, initiator proposal list 60, responder proposal list 62, proposal 64 and transform 66.

The notation used on the data model is the Object Model Technique (OMT) notation, and can be found in "Object-Oriented Modeling and Design", by Rumbaugh et al. In accordance with OMT notation, the boxes represent data objects, showing their type (e.g. Connection Definition) and the attributes associated with this type of object. The lines represent association, specifically references. An arrowed line is a one-way reference. A line with no arrows implies a two-way reference. References are usually handled by keeping the name of the referenced object in the data of the referencer. For example, a Security Policy object has a reference to one Initiator Proposal List object and a reference to one Responder Proposal List object, but neither of the Proposal List objects 'know' who holds references to them (hence the arrowheads). The dots (or lack of) show multiplicity. No dot implies one and only one reference. An open dot implies either no reference or at most one reference. The black dot means any number of references (i.e. 0 or more). A black dot with numbers means only those number of references are allowed (e.g. 1+means one or more; 2,4 means either 2 or 4). For example, a connection definition may or may not have a reference to a security policy (depending on the keying attribute being dynamic), but if it does it only has one reference (hence the open dot). On the other hand, any number of connection definitions may reference a particular security policy (hence the black dot).

Anchor filters 20 are provided to indicate to the system that certain IP traffic is to be protected using IPSec. These filters 20 reference a connection definition (CD) 26 that describes the role of the endpoints (host or gateway), and other connection information. There are two ways to establish a connection between systems: initiate the negotiation of a connection, or respond to the negotiation of a connection. In the case of connections with static keys (i.e. Connections that do not manage keys via IKE), both connection endpoints are said to initiate the negotiation of the connection, even though no actual negotiation takes place. Initiators of connections between systems using this connection definition (CD) 26 require a User Client Pair (UCP) 52 for each connection that it can initiate. There may be a multiplicity of UCPs 52 referring to a single CD 26. CDs 26 also have a reference to the Security Policy (SP) 58 necessary for this connection. There may be a multiplicity of CDs 26 referring to a SP 58. For systems that derive their IP address dynamically, which is usually the case for systems attaching to an Internet Service Provider (ISP) and that want to establish VPN connections to their home gateway, the home gateway can use deferred selectors 22 to associate an unresolved identifier (ID), that is an ID that does not have an IP address associated with it, with a CD 26. The resolution occurs dynamically during connection negotiation.

In accordance with the preferred embodiment of the invention, an API is provided for allowing access to VPN policy objects in a VPN Policy database from a GUI-type operations navigator (herein referred to as GUI). The API treats each data object (see FIG. 1) as a separate database, where all databases together constitute a VPN Policy database. In this way, the API allows VPN policy objects to be created, deleted, and retrieved.

Each object in a database has a unique key for keyed reference. This key is either a name or an ID, depending or the database. An ID is an identification of a system or group of systems in the VPN (e.g. An FQDN or an IPV4 subnet). All references between objects of different databases is via object name.

All databases in which objects have names support keyed references by object name. All other databases support keyed references by ID (i.e., ID of a specific system or group of systems).

Some databases have their objects customer-ordered and therefore also support referencing objects by the ID(s) associated with objects of that database (a pair of client identifiers (client ID pair) in the case of connection definitions, and a single ID in the case of remote ID groups), on a first applicable object basis. Client ID pairs define a subset of IP traffic and are made up of the ID of a local system (or group of systems), a local port, the ID of a remote system (or group of systems), a remote port, and a transport protocol (e.g. TCP). Client ID pairs are sometimes referred to as Data Endpoints (in contrast to connection endpoints). When referencing customer-ordered objects in this way, the objects are checked in order by the API. The first object that is associated with a superset of the input IDs is returned.

In accordance with the preferred embodiment of the model, the following databases are provided: deferred selectors 22 database, including name field 81 that is used in a single system-wide Deferred Selector List; connection definitions database 26, including name 82, selectors 83 (copied from associated anchor filter 20), local endpoint role 84 (gateway or host), remote endpoint role 85 (gateway or host), connection granularity 86, initializer 87 (local, external, both), keying 88 (static or dynamic), lifetime 89, NAT local client 91 (server hiding:boolean), and NAT remote client 92 (:boolean) fields, and any other information common to any connection protecting any portion of IP traffic specified by the selectors; remote endpoint ID groups database 32, including a name 96, and a list of IDs 108; local endpoint IDs 34, including a name and an ID; key management security policies database 36, including name 97, ISAKMP situation, initializer mode 98 (main/aggressive) and responder mode 99 (main/aggressive/*) fields; NAT address pools database 38, including a name and a list of IP addresses 100; key management proposals database 42, including name field 102; key management transforms database 44, including authentication mechanism 103, hash algorithm 104, encryption algorithm 105, pseudo-random function, lifetime, lifesize, key length, and DH group 106 fields; static authentication header security association (SA) pairs database 46, including name, inbound and outbound IPSec security policy indices (SPIs), authentication algorithm, encapsulation mode (tunnel/transport), and key rounds; static encapsulating security payload (ESP) security association pairs database 48, including name, inbound and outbound IPSec security policy indices (SPIs), encryption algorithm, authentication algorithm, encapsulation mode (tunnel/transport), and key rounds; static SA keys database 50, including name and key; user client pairs database 52, including name 110, local client ID 111, remote client ID 112, remote endpoint ID 113, initialization 114 (autostart, on-demand, user), and NAT local client (:boolean) 115 fields; IP addresses database 54, including an input ID and an output IP address; key management preshared keys database 56, including an input ID and a key; data management security policies database 58, including name 120, ISAKMP situation 121, perfect forward secrecy 122 (:boolean), and SA refresh threshold 123 fields; data management proposal lists databases 60 and 62, including name fields 124 and 125, respectively; data management proposals database 64, including name 126, transform list 128, ESP transform list 129, and IPComp transform list 130; data management transforms database 66, including name 131, type (ESP/AH/IPComp), encapsulation mode (tunnel/transport), encryption algorithm 132, authentication algorithm 133, DH group 134, key length, key rounds, lifetime 135 and lifesize 136 fields, and IPComp info; and server addresses database, including external ID and a list of IP.

These databases are also referred to as objects, objects being the more general term.

Connections definitions database 26 holds connection definitions. A connection definition holds information on what a connection looks like and how it is made. It is used to map a subset of IP traffic to a security policy and certain connection attributes. Since a connection definition 26 maps directly to an anchor filter rule 20, a customer-defined order between connection definitions 26 exists in the database. Therefore, a connection definition 26 that is enabled to create connections externally (i.e., as an ISAKMP responder), can be referenced via a client ID pair (IDci/IDcr from an ISAKMP initiator) using the 'get first applicable' function of the API in addition to the object name 82. Connection definition 26 objects are unique with respect to its anchor filter rule 20. If an anchor filter rule 20 is loaded on multiple interfaces, then that connection definition 26 applies to those multiple interfaces. Since no runtime or operational information is kept in the VPN policy database, a single, uniquely named connection definition 26 may exist in the database and apply for all effected interfaces. When the effective remote client ID, IDci, is a non-IP type (e.g. User@FQDN), the connection definition 26 is selected by the 'get first applicable' function of the API, which uses connection definition's 26 deferred selectors 22 to reference a remote ID group 32 as a list of potential matches of the effective, non-IP type remote client IDs.

A user client pair object 52 is associated with a connection definition 26 and is used to describe actual connections to be initiated by this system, as distinguished from those connections initiated by external systems. Names 110 for user client pair objects 52 are not customer generated, but rather internally generated by the GUI by concatenating the object's connection definition 26 name 82 with a unique sequence number for that connection definition 26; separated by ':L' (ConnDefName:Lseqnumber). The 'L' indicates that the connection is defined Locally, as opposed to connections defined Remotely (ConnDefName:Rseqnumber). The GUI/customer learns these names via the 'List' or 'List Key' function of the API.

A user client pair object 52 may also contain references to static security association (SA) objects 46 and 48. This is the case when the user client pair 52's connection definition 26 indicates a static policy (i.e. no dynamic keying via IKE).

Deferred selectors 22 use unresolved IDs, such as user IDs, to point to a connection definition 26. This way, policy can be established to map multiple groups of IDs to different security policies 58 prior to knowing the IP address of any of the IDs.

All deferred selector objects 22 are referenced by a single system-wide deferred selector list 24. This list 24 is, in turn, referenced by a single anchor filter rule 20 (the mobile/Dynamic_IP users filter rule 20).

Remote ID group 32 is a customer-generated (via the GUI) list of IDs 108 (or single ID 108) associated with a group name 96. It also directly references the local ID 34, key management security policy 36, and NAT pool 38 objects for this group 108 of IDs. This is the database that IKE starts with to locate key management (phase I) security policy 36, given a remote ID (IDii, if responding or IDir, if initiating). Since a single ID may map to multiple remote ID group objects 32, a customer-defined order between remote ID groups 32 exist in the database. Therefore, a remote ID group 32 can be referenced on the 'get first applicable' function of the API based on identifier (ID).

Local IDs database 34 associates a local ID (IDii when initiating, IDir when responding) with a local ID name.

IP addresses database 54 maps an ID (for example, DER ASN1 distinguished name) to an IP address, as input by the user via the GUI. No verification is made via DNS or similar that this mapping is correct. This mapping may be used by IKE for authentication of key management security policy 36.

A security policy object 58 maps a connection definition 26 to objects used to define the type of protection for traffic with respect to that connection definition. It holds references 61, 63 to data management (phase II) negotiation information (that is, data management proposal list 64) for dynamic policies.

Data management (as opposed to key management) proposal list 60, 62 holds a list of data management proposals 64 in order of customer preference to offer in ISAKMP initiator 18 role or to match against in ISAKMP responder 19 mode.

Data management proposal 64 holds references for IKE 16, 17 to data management transforms 66.

Data management transform 66 holds information for IKE 16, 17 on a specific ISAKMP phase II transform to offer or match against. Phase II is an ISAKMP term for the negotiation of keys to protect the actual user data (i.e. the real VPN connection). This is in contrast to Phase I, which is the negotiation of keys for a ISAKMP/ISAKMP connection to protect Phase II negotiations. One aspect of the preferred embodiment of the invention is that VPN connections (the results of a Phase II negotiation) are based mainly on data endpoints, while key management connections (the results of Phase I negotiations) are based on connection endpoints.

Key management security policy 36 is used to describe ISAKMP Phase I connections via references 45, 47 to an initiator key management proposal 42 to offer in ISAKMP initiator 18 mode and to a responder key management proposal 40 to match against in ISAKMP responder 19 mode.

A key management proposals 40, 42 hold references for IKE 16, 17 to key management transforms 44 in order of user preference.

Key management transforms 44 hold information for IKE 16, 17 on a specific Phase I transform to offer or against which to match. Pseudo-random function (prf) is an attribute that is negotiated by IKE.

Key management preshared keys database 56 maps a system ID or user ID to a preshared key for the purpose of authenticating an ISAKMP Phase I connection, when the key management security policy 36 authentication mechanism 103 indicates authentication via pre-shared keys. This database 56 should be implemented with some sort of out of band encryption protection to keep the keys secret on the system.

A static security pair 46, 48 (one inbound, and one outbound) is used when a given connection definition 26 indicates connections to not use IKE for key management and instead use static IPSec information and keys 50. Static security association pair objects 46, 48 come in two types, each with their own database: static AH SA pairs 46 and static ESP SA pairs 48. Information in a static security association pair 46, 48 is similar to that of an IPSec security association pair. A security association pair (SA Pair) is an IPSec term (RFC2401) for information used in the kernal on how protect a selected datagram (e.g. What algorithm to use, what is the key, etc.) created by an ISAKMP Phase II negotiation.

Static security association key 50 maps a reference from a static security association pair 46, 48 to the keying material 50 to use for a static connection. This database 50 should be implemented with some sort of out of band encryption protection to keep the keys secret on the system.

NAT address pool database 38 lists all the external IP addresses 100 that can be used to NAT to/from a particular remote ID. Addresses from these pools 38 are used to NAT the local data endpoint address when a user client pair 52 indicates NAT local client 115 and to NAT the remote data endpoint address when a connection definition 26 indicates NAT remote client 92. This is described in detail in copending patent application Ser. No. 09/240,720.

Server is a database 28 that is used to hide the actual internal server address(es) 141 behind a single external, globally known server ID 28. This is done by NATing the local data endpoint address (not shown) to one of the server's internal addresses 141 whenever the connection definition 26 indicates NAT local client 91.

A series of 'integrity checks' or audits are performed on the data in the VPN Policy database to ensure correct operation of the VPN. These audits may be done either during policy creation and updating, or during runtime, when the data is acted upon. These audits include general audits and audits specific to a database. General audits include (a) ensuring objects referenced by other objects exist, (b) fields are valid, (c) object is unique with respect to its key (name or ID), and (d) indicated protocols and algorithms are supported.

Audits specific to a database include (a) no connection definition 26 can be updated or deleted while an active connection exists for that connection definition, (b) no proposal 64 is used that has an encapsulation mode 127 of transport when either of the used connection definition endpoint roles 84,85 indicates gateway, (c) if a connection definition 26 references a deferred selector 22, then the connection definition's granularity 86 for remote ID must indicate that the source of the connection's client IDs be from the client ID pair, and the remote endpoint role 85 must be host, (d) all connection definition selectors 83 must indicate IP-types (IPV4 or IPV6; address, subnet, or range), (e) user client pair's local client ID 111 and remote client ID 112 must be within the associated connection definition selectors 83, and must be correct with respect to the associated connection definition granularity 86, (f) if a connection definition's keying 88 indicates dynamic, a security policy reference 35 must exist, (g) is a. connection definition's keying 88 indicates static, all user client pairs 52 associated with the connection definition 26 must have a static AH SA pair reference 53 or a static ESP SA pair reference 55, or both, (h) no static AH SA pairs 46 or static ESP SA pairs 48 with an encapsulation mode of transport are referenced by a user client pair 52 that references a connection definition 26 with a local endpoint role 84 or remote endpoint role 85 of gateway, (i) no user client pair 52 can reference a connection definition 26 whose initializer 87 indicates external only, (j) length of key in static key 50 is correct for the algorithm it is used for, (k) ID type fields found in the VPN Policy database indicates ID types consistent with those of Table 1.

TABLE 1

ID TYPES

| DB Object | IP Addr | IP Addr Range | IP Addr Subnet | ID Types User @ FQDN | ASN.1 DN | KEY_ID | I/F Name | Host Name (FQDN) |
|---|---|---|---|---|---|---|---|---|
| Conn Definition.Selectors | X | X | X | | | | X | |
| User Client Pair.ClientIDs | X | X | X | | | | X | X |
| UserClient Pair.Remote E/P ID (Dynamic | X | | | X | X | X | | X |
| UserClient Pair.Remote E/P ID (Static Deferred | X | | | | | | | X |
| Selector.RIDG.RID RemoteIdGroup.Remote E/P ID | | | | X | X | X | | |
| | X | X | X | X | X | X | | X |
| Server | X | X | | | | | | |
| Local E/P ID | X | | | X | X | X | | X |
| Internal Server ID | X | X | X | | | | | |
| NAT Pool ID | X | X | X | | | | | |
| IP Address.inId | X | | | X | X | X | | |
| IP Address.outId | X | | | | | | | |
| Pre-shared Key.id | X | | | X | X | X | | |

In accordance with the preferred embodiment of the model, an API is defined for the purpose of creating, updating, deleting, and retrieving database objects in the VPN Policy database. Specific functions of the API include get_by_name (to retrieve objects from databases keyed by a name), get_by_id (to retrieve objects from databases keyed by an ID), get_first_applicable (to retrieve the first object that is associated with the input ID information; used for connection definitions 26 and remote endpoint ID groups 32), create, update, delete, list (to list all objects of a database in their entirety), and list_key (to list only the keys, i.e. Name or ID, of all objects of a database). The API is used by the GUI to create and update VPN security policy and by the IKE/VPN Mgr functions 16, 17 when creating and managing VPN connections.

A connection is a relationship between two IPSec endpoints 18, 19 that protect a specific set of IP traffic between them in a pre-defined manner, according to each endpoint's VPN policy.

Connections are created from connection definitions 26. Connection definitions 26 are user-specified objects that are associated one-to-one with a user-specified filter rule when that filter rule's action is 'Protect with IPSec'. This filter rule is called an anchor filter 20 rule. Anchor filter rules 20 are used to protect a subset of IP traffic according to a security policy 58. Therefore, all connections created from a specific a specific connection definition will have the same security policy 58. The exception to this is dynamically assigned IP addresses for remote, mobile users with dynamically-assigned IP addresses. For these cases, a single anchor filter rule 20 can be associated with multiple connection definitions 26.

Because of this association of a single anchor filter rule 20 to a single connection definition 26, and the fact that anchor filter rules 20 are ordered, connection definitions 26 have an inherent ordering among themselves. The IP traffic that is associated with a connection definition is specified by its selectors 83, which are copied from its associated anchor filter rule 20 when the anchor filter rule is loaded onto the systems interface (i.e. becomes active). A set of selectors has the following attributes:

Local IP address (single,range,addr+mask,*)
Remote IP address (single,range,addr+mask,*)
Transport protocol (value,*)
Local port (value,*)
Remote port (value,*)

In order to create a connection from a connection definition 26, a client ID pair is needed. A client ID pair is made of two client IDs, a local client ID and a remote client ID. Like selectors 83, they are used to define a subset of IP traffic, for example all TCP traffic to or from host A from or to any host on subnet B. A client ID has the following attributes:

ID type
  IPv4 address
  IPv6 address
  FQDN (for example, foo.bar.com)
  User FQDN (for example, piper@foo.bar.com)
  IPv4 subnet (addr & mask)
  IPv4 range (1st addr & last addr)
  IPv6 subnet (addr & mask)
  IPv6 range (1st addr & last addr)
  DER ANS1 dist name
  Physical interface or PPP profile name (implementation-specific)
  0 (meaning don't care)
ID value
Protocol (specific value, or 0 meaning don't care)
Port (specific value, or 0 meaning don't care)

A client ID pair, in conjunction with a connection definition 26 (and it's related information such as security policy, etc.), provides all the information needed to create a connection. Thus, connection definition +client ID pair =connection.

The client ID pair is obtained from a user-specified user client pair 52, for the case of startable, scheduled on-demand, or autostart connections; or from a remote system via IKE, for responder-mode connections (i.e. IDci/IDcr). On-demand connections use data in the 'demanding' IP packet to define a client ID pair.

One or more connections can be created from a single connection definition 26, depending on that connection definition's connection granularity 86. Connection granularity 86 defines what subset of the IP traffic that is associated with this connection definition will be associated with each connection created from this connection definition 26. It does this by specifying the source of the different attributes of a connection's local client ID and remote client ID. For each attribute, connection granularity 86 specifies the source as taken directly from the connection definitions selectors 83 ('filter'); a single value taken from the client ID pair ('single'); or taken directly from the client ID pair ('client').

By ensuring that all connections created from a connection definition 26 derive their local and remote client IDs in this consistent manner, and by ordering connections with more specific masked IP address (source address priority) ahead of those with less specific masked IP addresses, a predictable and non-conflicting ordering of connections can be derived when building the filter rules (SPD entries) for the IP stack. The exception to this is the last selection (that is, taken directly from client ID pair). This selection is used mostly for creating connections in responder-mode, since the connection granularity 86 of the Client ID pair of an initiating remote endpoint may not be known ahead of time. This, however, allows creation of connections that are not orderable in a predictable and non-conflicting manner. Therefore, this situation must be handled dynamically (that is, when loading the filter rules (SPD entry) for this connection to the kernel or, preferably, when IKE 16, 17 is negotiating the Phase II Security Associations) to ensure that a candidate connection does not adversely overlap with an existing connection.

Referring to Table 2, local and remote endpoint roles are described.

TABLE 2

LOCAL AND REMOTE ENDPOINT ROLES

| Local | Remote | Effect on Connection Granularity |
|---|---|---|
| Gateway | Gateway | No changes |
| Gateway | Host | Remote ID must be specific value |
| Host | Gateway | Local ID must be specific value |
| Host | Host | Local & Remote IDs must be specific values |

Along with connection granularity 86, another attribute of a connection definition 26 is local endpoint role 84 and remote endpoint role 85. A role in this sense is either a security gateway (GW) or a host (H). The local endpoint is the system that will encrypt outbound traffic and decrypt inbound traffic. Conversely, the remote endpoint is the system that will decrypt and encrypt that traffic. The values of these two attributes 84, 85 effect the allowable values for the connection definition connection granularity 86. The values of these two attributes 84, 85 also effect valid negotiable IP Sec transforms, in that if the local or remote role 84, 85, respectively, is gateway, no transform 66 may be negotiated that has an encapsulation mode of transport.

A connection's client IDs are generated using client ID pairs, local and remote endpoint roles 84, 85, connection granularity 86 and the connection definition's selectors 83. This is done by:

1. Checking the connection definition selectors 83 for which granularity 86 indicates 'filter' against the local endpoint role 84 and remote endpoint role 85, as shown in Table 2; and
2. Checking the client ID pair (either a user client pair 52 or an ISAKMP IDci/IDcr) to ensure it is within the bounds of the connection definition selectors 83; and
3. Checking the client ID pair against the connection definition granularity 86 to ensure it is of the correct granularity (that is, granularity values of 'single' must correspond to single values in the client ID pair); and 4. Checking those attributes of the client ID pair for which the granularity 86 indicates 'single' or 'client' against the local endpoint role 84 and remote endpoint role 85, as shown in Table 2; and 5. Using the client ID pair and the connection definition selectors 83 to generate the connection client IDs according to the connection granularity; 'client' or 'single' indicate the value comes from the client ID pair, 'filter' indicates the value comes from the connection definition selectors 83.

The resulting connection client IDs are then used to create the filter rules (SPD entry) for this connection in the kernal.

Advantages over the Prior Art

It is a further advantage of the invention that there is provided a system and method for creating, maintaining, deleting and retrieving VPN policy objects.

It is a further advantage of the invention that there is provided a system and method for enabling acceptance of previously unknown IDci/IDcr values from a remote system.

It is a further advantage of the invention that there is provided a system and method enabling dynamic generation, load, and management of multiple IPSec filter rules.

It is a further advantage of the invention that there is provided a system and method enabling ISAKMP phase II driven phase I connections.

It is a further advantage of the invention that there is provided a system and method enabling handling of remote initiating hosts with dynamically assigned IP addresses with differing security policy requirements.

It is a further advantage of the invention that there is provided flexibility in policy definition in the areas of dynamically-assigned IP addresses, remotely-defined ISAKMP client IDs (IDci/IDcr), and separation of ISAKMP Phase I (key management) policy information from ISAKMP Phase II (data management) policy information.

It is a further advantage of the invention that there is provided a data model for representing and abstracting IPSec/ISAKMP-based VPN configuration information for an IPSec-capable computer system in a virtual private network that (1) allows for each customer-generated customer-ordered security policy database (SPD) entry, multiple VPN connections to be dynamically established (these connections may or may not have been previously defined); (2) allows for a data-security-policy-driven approach to rekeying (via IKE) where (a) the key management connection (i.e. the secure connection used to exchange keying material for the data connections) is created and maintained by security policy and on an on-demand basis by data connection activity, and (b) the key connection security policy is determined solely by the identity of the remote connection endpoint; (3) allows for dynamically establishing VPN connections with different security policies and other attributes, based solely on an unfixed IP address (e.g. a user ID)—these connections may or may not have been previously defined. This aspect is used for supporting systems with dynamically-assigned IP addresses that wish to establish a VPN connection with the local system.

Alternative Embodiments

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Accordingly, the scope of protection of this invention is limited only by the following claims and their equivalents.

We claim:

1. A policy database system for managing security objects, comprising:

a deferred selectors component;

a connection definition;

a user client pair;

a manual connection component;

a remote connection endpoint attributes component including a phase I processing component; and a phase II processing component;

said connection definition having a zero or one reference relationship with said deferred selectors component, a zero or more reference relationship with said user client pair, and a zero or one reference relationship with said phase II processing component; said user client pair further having a zero or one reference relationship with said manual connection component; and said deferred selectors component having a one and only one reference relationship with said remote connection attributes component.

2. The policy database system of claim 1 further for enabling acceptance at a responder node of a previously unknown client ID pair from an initiator node, said connection definition comprising indicia for determining if said unknown client pair is acceptable to said responder node and said phase II processing component comprising a policy for negotiating said unknown client ID pair.

3. The policy database system of claim 1 further for enabling dynamic generation, loading and management of multiple connection filters, said connection definition being selectable selectively by said user client pair or a client ID pair received from a remote initiator node for identifying pertinent granularity attributes defining the subset of datagrams that can be associated with any one connection instantiated from said connection definition.

4. The policy database system of claim 1 further for enabling ISAKMP phase II driven phase I connections, said remote connection endpoints attributes further comprising a remote endpoint identifier and a reference pointer for associating said remote endpoint identifier with a phase I negotiation policy in said phase I processing component.

5. The policy database system of claim 1 further for enabling secure connection by a responder node to a remote initiating host with dynamically assigned IP address, further comprising:

an anchor filter for defining datagrams that may be associated with remote hosts using dynamically assigned IP addresses;

said deferred selectors component further providing a one to many mapping from said anchor filter to said connection definitions.

6. A method for managing a policy database, said database including a deferred selectors component, a connection definition, a user client pair, a manual connection component, a remote connection endpoint attributes component including a phase I processing component; and a phase II processing component, comprising the steps of:

maintaining a zero or one reference relationship of said connection definition with said deferred selectors component;

maintaining a zero or more reference relationship of said connection definition with said user client pair;

maintaining a zero or one reference relationship of said connection definition with said phase II processing component;

maintaining a zero or one reference relationship of said user client pair with said manual connection component; and maintaining a one and only one reference relationship of said deferred selectors component with said remote connection attributes component.

7. The method of claim 6, further for enabling acceptance at a responder node of a previously unknown client ID pair from an initiator node, comprising the further steps of:

determining from connection definition indicia if said unknown client pair is acceptable to said responder node, and if so obtaining from said phase II processing component a policy for negotiating said unknown client ID pair.

8. The method of claim 6, further for enabling dynamic generation, load and management of multiple connection filters, comprising the further steps of:

obtaining from a said connection definition, selectively selected by said user client pair or a client ID pair received from a remote initiator node, granularity attributes defining the subset of datagrams that can be associated with any one connection instantiated from said connection definition.

9. The method of claim 6, further for enabling ISAKMP phase II driven phase I connections, comprising the further steps of:

associating a remote endpoint identifier in said remote connection endpoints attributes with a phase I negotiation policy in said phase I processing component.

10. The method of claim 6, further for enabling secure connection by a responder node to a remote initiating host with dynamically assigned IP address, further comprising the steps of:

providing an anchor filter for defining datagrams that may be associated with remote hosts using dynamically assigned IP addresses; and said deferred selectors component further providing a one to many mapping from said anchor filter to said connection definitions.

11. A program storage device readable by a machine, tangibly embodying a program of instructions executable by a machine to perform method steps for managing a policy database, said database including a deferred selectors component, a connection definition, a user client pair, a manual connection component, a remote connection endpoint attributes component including a phase I processing component; and a phase II processing component, said method steps comprising:

maintaining a zero or one reference relationship of said connection definition with said deferred selectors component;

maintaining a zero or more reference relationship of said connection definition with said user client pair;

maintaining a zero or one reference relationship of said connection definition with said phase II processing component;

maintaining a zero or one reference relationship of said user client pair with said manual connection component; and maintaining a one and only one reference relationship of said deferred selectors component with said remote connection attributes component.

12. An article of manufacture comprising:

a computer useable medium having computer readable program code means embodied therein for managing a policy database, said database including a deferred selectors component, a connection definition, a user client pair, a manual connection component, a remote connection endpoint attributes component including a phase I processing component; and a phase II processing component, the computer readable program means in said article of manufacture comprising:

computer readable program code means for causing a computer to effect maintaining a zero or one reference relationship of said connection definition with said deferred selectors component;

computer readable program code means for causing a computer to effect maintaining a zero or more reference relationship of said connection definition with said user client pair;

computer readable program code means for causing a computer to effect maintaining a zero or one reference relationship of said connection definition with said phase II processing component;

computer readable program code means for causing a computer to effect maintaining a zero or one reference relationship of said user client pair with said manual connection component; and computer readable program code means for causing a computer to effect maintaining a one and only one reference relationship of said deferred selectors component with said remote connection attributes component.

13. A policy database system for managing security objects and enabling ISAKMP phase II driven phase I connections, comprising:

a deferred selectors component;

a connection definition;

a user client pair;

a manual connection component;

a remote connection endpoint attributes component including a phase I processing component; and a phase II processing component;

said connection definition having a zero or one reference relationship with said deferred selectors component, a zero or more reference relationship with said user client pair, and a zero or one reference relationship with said phase II processing component; said user client pair further having a zero or one reference relationship with said manual connection component; and said deferred selectors component having a one and only one reference relationship with said remote connection attributes component; and said remote connection endpoints attributes further comprising a remote endpoint identifier and a reference pointer for associating said remote endpoint identifier with a phase I negotiation policy in said phase I processing component.

14. A method for managing a policy database and enabling ISAKMP phase II driven phase I connections, said database including a deferred selectors component, a connection definition, a user client pair, a manual connection component, a remote connection endpoint attributes component including a phase I processing component; and a phase II processing component, comprising the steps of:

maintaining a zero or one reference relationship of said connection definition with said deferred selectors component;

maintaining a zero or more reference relationship of said connection definition with said user client pair;

maintaining a zero or one reference relationship of said connection definition with said phase II processing component;

maintaining a zero or one reference relationship of said user client pair with said manual connection component;

maintaining a one and only one reference relationship of said deferred selectors component with said remote connection attributes component; and associating a remote endpoint identifier in said remote connection endpoints attributes with a phase I negotiation policy in said phase I processing component.

15. A program storage device readable by a machine, tangibly embodying a program of instructions executable by a machine to perform method steps for managing a policy database and enabling ISAKMP phase II driven phase I connections, said database including a deferred selectors component, a connection definition, a user client pair, a manual connection component, a remote connection endpoint attributes component including a phase I processing component; and a phase II processing component, said method steps comprising:

maintaining a zero or one reference relationship of said connection definition with said deferred selectors component;

maintaining a zero or more reference relationship of said connection definition with said user client pair;

maintaining a zero or one reference relationship of said connection definition with said phase II processing component;

maintaining a zero or one reference relationship of said user client pair with said manual connection component;

maintaining a one and only one reference relationship of said deferred selectors component with said remote connection attributes component; and associating a remote endpoint identifier in said remote connection endpoints attributes with a phase I negotiation policy in said phase I processing component.

* * * * *